May 27, 1952  W. HUNGATE  2,597,933
FRUIT STUFFING MACHINE
Filed Aug. 18, 1947  5 Sheets-Sheet 1

INVENTOR:
WILLIAM HUNGATE
BY
Murray Robinson
ATTORNEY

May 27, 1952 W. HUNGATE 2,597,933
FRUIT STUFFING MACHINE
Filed Aug. 18, 1947 5 Sheets-Sheet 2
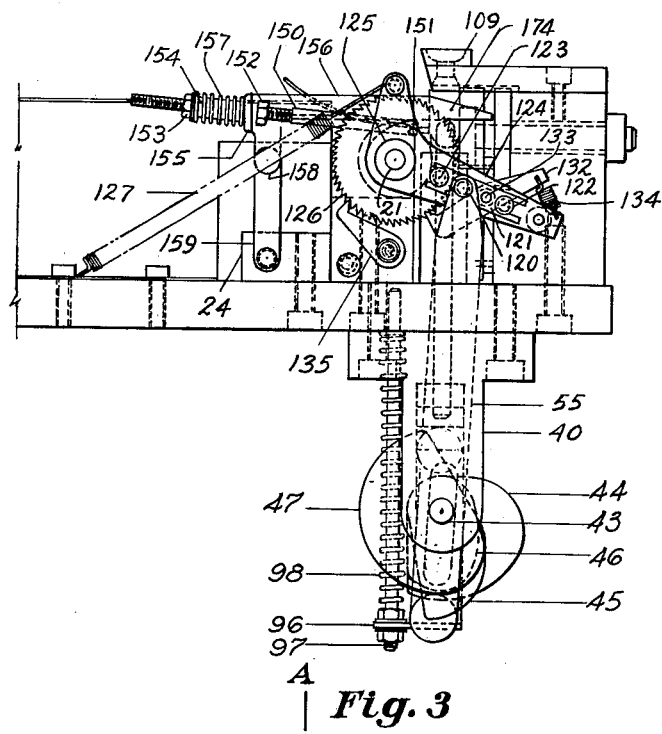
Fig. 3
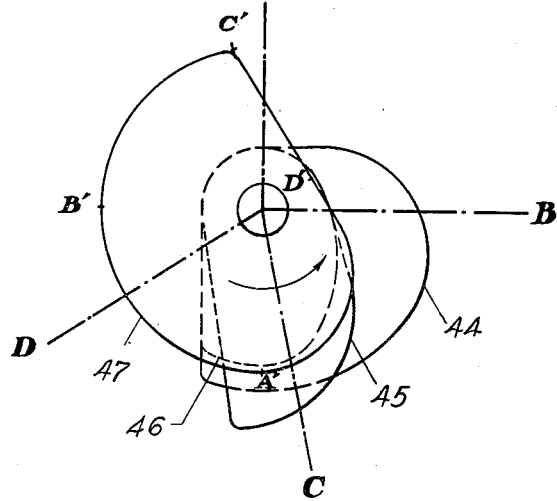
Fig. 3-A
INVENTOR:
WILLIAM HUNGATE
BY Murray Robinson
ATTORNEY May 27, 1952 W. HUNGATE 2,597,933
FRUIT STUFFING MACHINE
Filed Aug. 18, 1947 5 Sheets-Sheet 3

INVENTOR:
WILLIAM HUNGATE
BY
Murray Robinson
ATTORNEY

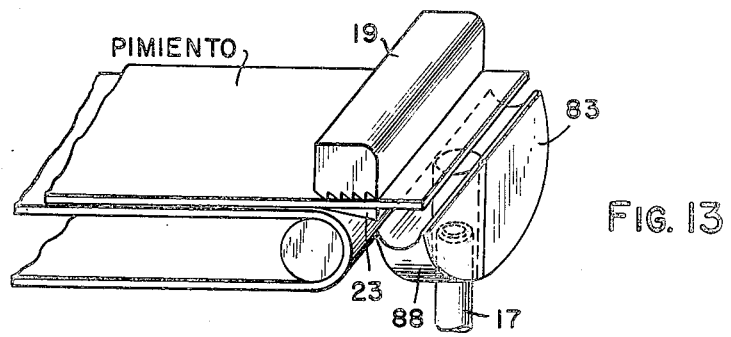
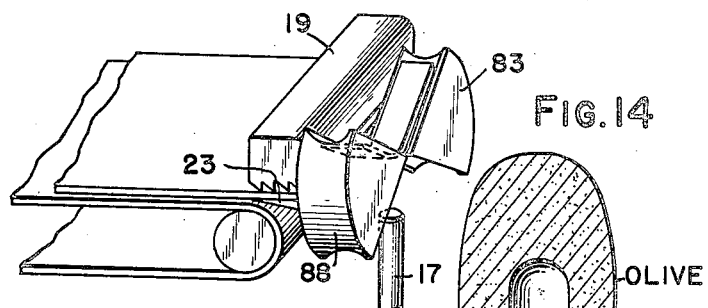
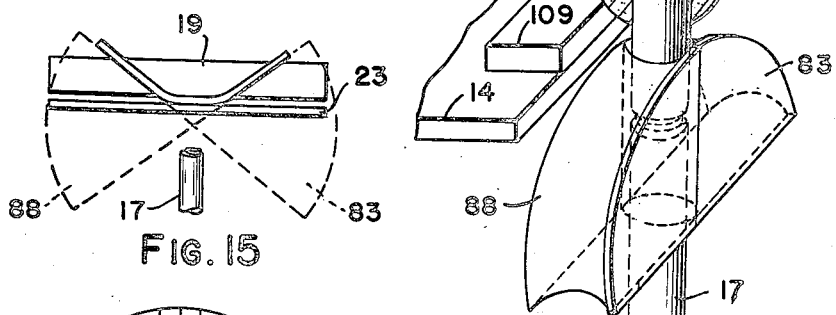
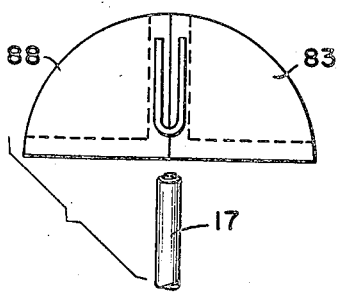

Patented May 27, 1952

2,597,933

UNITED STATES PATENT OFFICE 2,597,933

FRUIT STUFFING MACHINE

William Hungate, Houston, Tex., assignor, by mesne assignments, to Leverton and Company, Houston, Tex., a corporation of Texas Application August 18, 1947, Serial No. 769,155

14 Claims. (Cl. 146—27)

This invention pertains to fruit processing machinery and more particularly to apparatus for stuffing olives with slices of pimiento although adaptable to other kinds of stuffing material and other kinds of fruit.

Olives are usually stuffed by first removing the seed and a bit of the core at one end and thereafter inserting a narrow slice of the skin and outer flesh of a pimiento, the slice being folded double with the skin part outermost and inserted in the opening in the olive ends first leaving the folded central portion exposed at the end of the olive and substantially flush with the outer surface thereof.

Prior to this invention it is believed there was no machine available commercially for stuffing olives in this manner, such operation theretofore being performed by hand.

It is the object of this invention to provide a machine which will stuff olives automatically in the manner heretofore described.

It is a further object of the invention to provide a machine that will thus stuff olives more uniformly and better than has heretofore been possible.

It is another object of the invention to provide a machine that will stuff olives more rapidly than has heretofore been possible.

Still another object of the invention is to provide an olive stuffing machine that is simple in construction, easy to operate, light in weight, and which will require a minimum of attention by way of maintenance and repair.

Other objects of the invention will appear from the following description thereof.

Briefly stated the machine according to the invention comprises an apertured support on which the machine operator successively places and holds pitted and cored unstuffed olives or other fruit and then removes them after the machine has stuffed them. A non-reversing conveyor such as an endless belt on which the operator places long strips of the skin and the outer flesh of pimientoes is caused to move step by step to carry the pimiento to a table serving as a support for the end of the strip and extending beneath the olive support. The serrated undersurface of a horizontally and vertically reciprocating bar overlying the table serves as a feed hand to periodically force the pimiento strip along the table until a portion of it extends beyond the edge of the table. At this time a pair of semicylindrical cross section jaws initially lying open in a position just below and beyond the edge of the table are actuated to pivot about an axis perpendicular to the edge of the table and disposed in the center thereof. The cutting edges of the jaws cooperate with a shear formed by the leading edge of the reciprocating bar to cut a slice of pimiento. The initial cutting action is between each of the cutting edges of the jaws acting as one blade of a scissors with the shearing edge of the reciprocating bar which then holds the pimiento strip on the table forming the other blade. As the jaws close the finger or body portions of the jaws adjacent the cutting edges thereof fold the pimiento slice in the middle and upon final closure the edges of the jaws come together to complete the cutting action. The closed jaws form a cylindrical tube through which an ejector in the form of a plunger rod is then moved, pushing the pimiento slice out of the jaws into the olive above. The feed hand is then lifted and moved back to take hold anew of the pimiento strip, the jaws open, and the plunger drops to its original position.

The step-by-step motion of the belt conveyor and the horizontal reciprocation and the periodic raising and lowering of the bar that serves both as a shear and as a feed hand, the oscillation of the jaw fingers, and the actuation of the plunger rod are caused by the revolution of a cam shaft carrying four cams and are thereby synchronised. The cam shaft can be conveniently driven by an electric motor.

The present invention has many advantages. The pimiento strips are carried on a belt conveyor most of the distance to the cutting jaws. Only a short table of very small length compared to the length of a whole pimiento strip need be traversed by the strip. Thus there is but a short distance over which the strip must slide and during the time it does so it is aided not only by the frictional grip of the feed hand but by the pushing force exerted by the remainder of the strip still on the belt conveyor. Thus there is very little likelihood of the pimiento being torn apart. Furthermore the pimiento is not torn or marked by the feed mechanism which would spoil its appearance.

Another principal advantage of the machine of the present invention lies in the combination in an integral mechanism of the pimiento cutting, folding, and holding functions. The jaws of the present invention perform all these functions.

For a detailed description of a preferred embodiment of the invention reference will now be made to the accompanying drawings in which:

Figure 3 is a side view of the apparatus shown in Figure 1.

Figure 3A is a diagrammatic representation to a larger scale of the four main cams as viewed in Figure 3.

Figures 10, 11, 12:
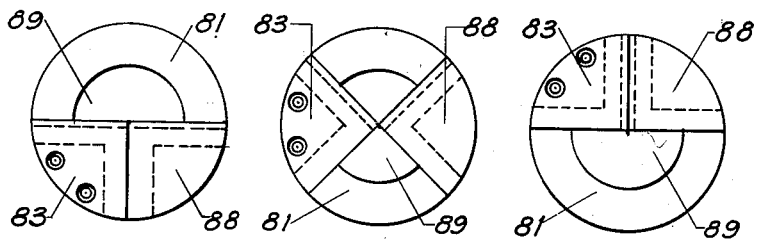

Figures 10, 11, and 12 are end views of the jaw mechanism showing same respectively in open, half closed, and closed positions.

Figures 13, 14, 15, 16 and 17 are diagrammatic views illustrating the operation of the machine and showing in sequence various stages in the cutting, bending or folding of the pimiento, and the stuffing of the olive.

Figure 1:
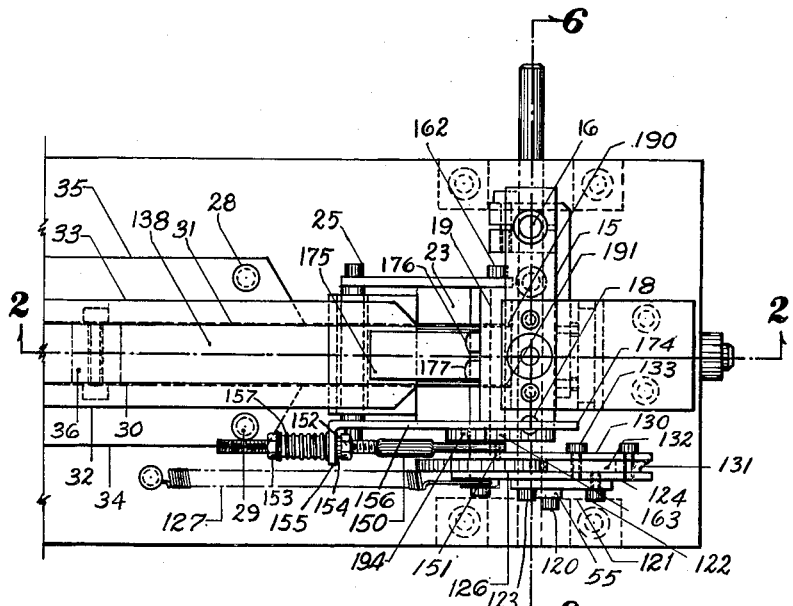
Figure 1 is a top view of the olive stuffing and pimiento slicing and folding mechanism and the head end of a portion of the belt conveyor of a machine according to the invention, the tail end of the belt conveyor not being shown since it is but a duplication of the portion illustrated.
Figure 2:
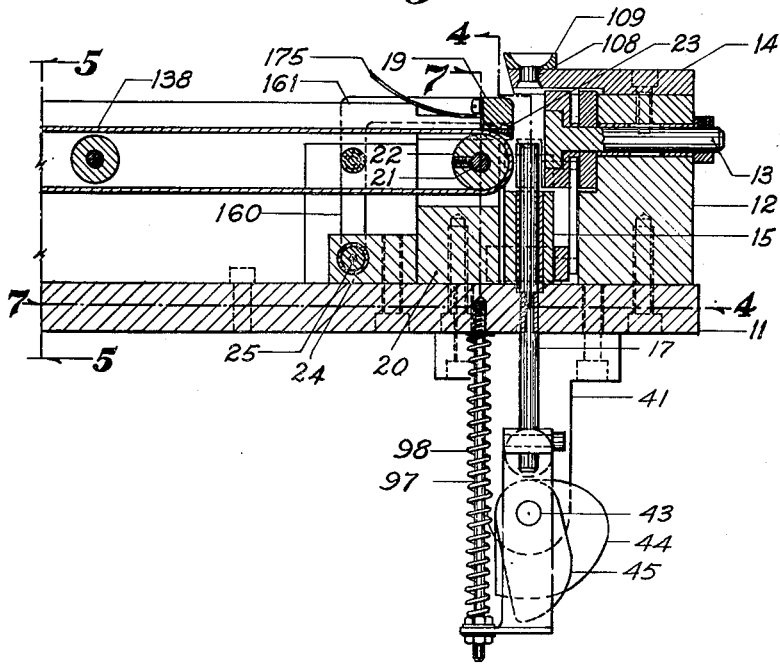
Figure 2 is a section on the lines 2—2 of Figures 1 and 6.
Figure 5:
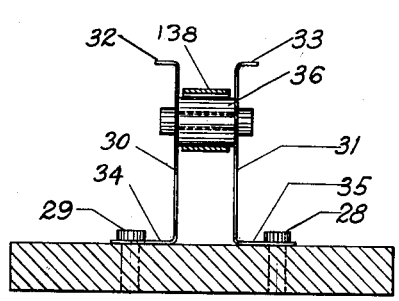
Figure 5 is a section on the line 5—5 of Figure 2.

Referring now to Figures 1 and 2, the machine comprises a base board 11 to which are secured by suitable means, such as the screws shown, a head block 12 in which the shaft 13 of the jaw mechanism is journaled and which also carries the olive support arm 14; a guide block 15 in which slide the jaw actuating rod 16, the pimiento ejection plunger rod 17, and the lift rod 18 for the combination pimiento feed hand and pimiento shear formed by bar 19; a central block 20 in which the shaft 21 of belt pulley 22 is journaled and to the top of which table or pimiento support in the form of a flat plate 23 is secured; and a bearing block 24 in which the shaft 25 of the feed and shear mechanism is pivotally mounted. In addition to the four blocks there are secured to the top of the base by screws such as shown at 28 and 29 two vertical pimiento guide plates 30 and 31 having upper and lower outturned horizontal flanges 32, 33, 34, 35, best shown in Figure 5, and between which guide plates are secured cylindrical belt spacing and supporting blocks 36.

Figure 6:
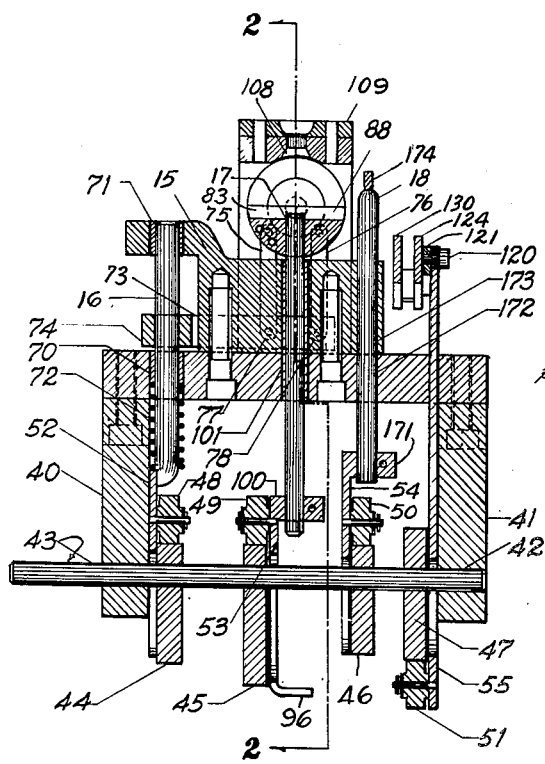
Figure 6 is a section on the line 6—6 of Figure 1.

Depending from the bottom of the base board 11 are secured two legs 40 and 41, best shown in Figure 6. Journalled in these legs is the cam shaft 42, one end 43 of which extends outwardly for connection to a suitable driving means. Secured to the shaft 42 are four cams 44, 45, 46, and 47 on which ride cam followers 48, 49, 50, and 51 which are pivotally mounted on the sides of guide plates 52, 53, 54, and 55. The lower parts of plates 52 and 54 are forked and the lower parts of plates 53 and 55 are apertured to provide a through passage for the cam shaft.

Figure 8:
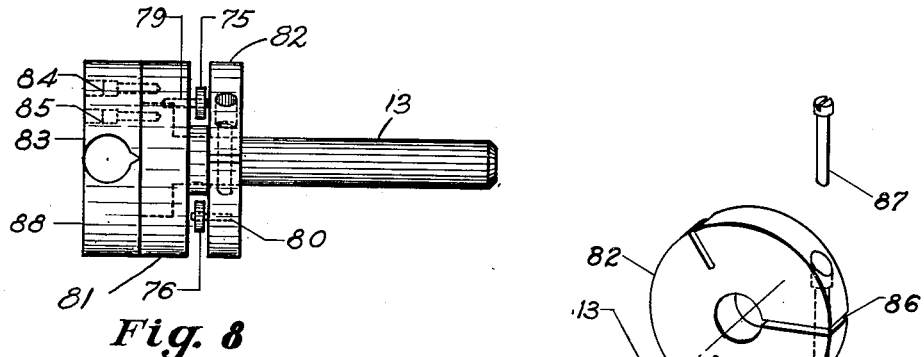
Figure 8 is a detail of the jaw mechanism showing it in assembled position.
Figure 9:
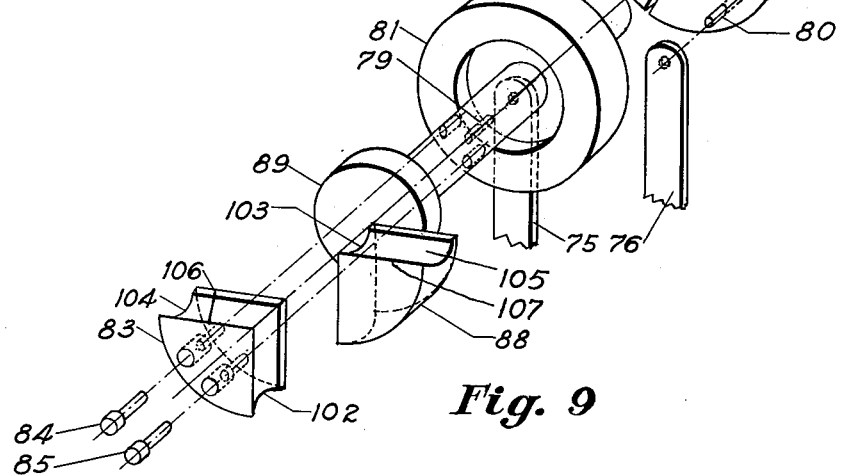
Figure 9 is an exploded view of the mechanism shown in Figure 8.

The top of plate 52 is welded to rod 16 which slides in sleeve bearings 70 and 71 in the base board 11 and guide block 15 respectively. A compression spring 72 surrounds rod 16 and bears at its lower end against the top of plate 52 and at its upper end against the bottom of sleeve 70. The spring keeps cam follower 48 in contact with cam 44. Arm 73 is adjustably clamped to rod 16 at 74. Jaw operating links 75 and 76 are each pivotally connected at one end to arm 73 at 77 and 78. As best shown in Figures 8 and 9, the other ends of links 75 and 76 are pivotally connected by pins 79 and 80 to drive rings or collars 81 and 82 respectively. Ring 81 is secured to jaw 83 by screws 84 and 85 while ring 82, which is split at 86, is clamped by screw 87 to shaft 13 which is integral with jaw 88. Each of the jaws is in the form of a ninety degree sector of a disc. Shaft 13 is also provided with a hub 89 which forms a bearing surface about which ring 81 can turn. By the foregoing means the jaw fingers are so mounted as to constrain their motion between an open position in which the fingers are in a horizontal line end to end just beneath the level of the table supporting the end of the pimiento strip and directly below the overhanging slice to be cut therefrom and a closed position in which the fingers are substantially parallel and immediately adjacent each other to hold the slice after it has been cut. In the intervening positions the fingers bend or fold the slice double.

Referring again to Figure 6, the plate 53 is provided with a foot 96. The foot has a hole therein (see Figure 3) through which passes a rod 97 which is secured at its top end to base board 11. A compression spring 98 is disposed around rod 97 and bears at its lower end against foot 95 and at its upper end against base board 11. The spring serves to keep cam follower 49 in contact with cam 45.

The upper end of plate 53 is adjustably clamped at 100 to pimiento ejector plunger rod 17. The rod 17 slides in sleeve bearing 101 and its upper end normally rests in the cylindrical tube-like structure formed by the two semi-cylindrical or trough shaped surfaces 102 and 103 (see Figure 9) of the jaw fingers 83 and 88. When links 75 and 76 are raised the surfaces 102 and 103 separate and the upper surfaces 104 and 105 of the jaw fingers come together (see Figures 10, 11, and 12). The upper surfaces are also semi-cylindrical so that even when the jaw fingers are closed as shown in Figure 8, there is still provided a cylindrical tube through which the rod 17 can travel when it is raised.

One edge of each of the upper surfaces 104 and 105 of the jaw fingers is ground to a sharp cutting edge as shown at 106 and 107. The cutters thus formed cooperate with the shear formed by the sharpened forward edge of the bar 19 and with each other to cut off slices of pimiento simultaneously the jaw fingers bend or fold them double, whereupon by means of the rod 17 the pimiento is ejected from the fingers and pushed up through hole 108 in the olive support 109 (see Figures 2 and 6) that is screwed to the arm 14. Since the jaw cutters are integral with the jaw fingers, the means mounting and constraining the motion of the fingers together with the fingers themselves serve as means to mount the pair of cutters and constrain their motion from open to closed position to cause their cutting edges to traverse the shearing edge of the feed hand from positions away from the center thereof on opposite sides towards the center thereof and the two means are inherently synchronized.

Again referring to Figure 6, the upper end of plate 55 is pivotally connected by screw 120 to a plate 121. As shown in Figure 3 the plate 121 has forked ends through which it is adjustably secured by screws 122 and 123 to the horizontal arm of bell crank lever 124. The bell crank lever is pivotally supported on the hub 125 of ratchet wheel 126 which is welded to belt pulley shaft 21.

The vertical arm of the bell crank lever is connected to one end of a tension spring 127, the other end of which is screwed to the base board 11. The spring 127 keeps cam follower 51 in contact with cam 47.

As best shown in Figure 1, another bell crank lever 130 is pivotally supported on belt pulley shaft 21 on the other side of ratchet wheel 126 from bell crank lever 124. The horizontal arms of the two bell crank levers are secured together by screw 131. Between the two levers a pawl 132 (see also Figure 3) is pivotally supported on screw pin 133. One end of the pawl is connected to the extreme end of the horizontal arm of bell crank 124 by a tension spring 134 which urges the tooth end of the pawl against ratchet wheel 126. By this means the ratchet wheel is caused to turn clockwise in a step by step manner as the plate 55 is reciprocated up and down by cam 47 and return motion spring 127. To prevent overhauling of the ratchet wheel there may be provided one or more locking pawls such as that shown at 135. The pawl 135 is pivotally mounted on stub shaft 136 (see Figure 7) and is urged into engagement with the ratchet wheel by torsion spring 137. The step by step rotation of the ratchet wheel drives the belt pulley 22 and conveyor belt 138 in a like step by step fashion carrying strips of pimiento onto table 23 (see Figure 2).

Figure 7:
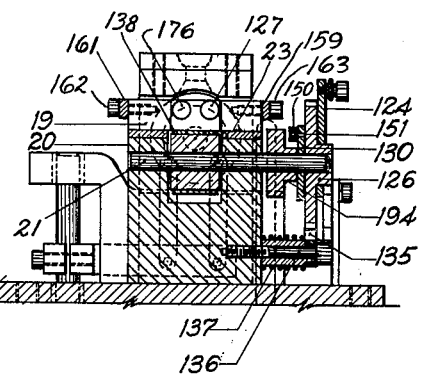
Figure 7 is a section on the line 7—7 of Figure 2.

The vertical arm of bell crank 130 is pivotally connected to one end of a rod 150 by a pin 151 (see Figures 1, 3 and 7). The other end of rod 150 is screw threaded and between two nuts 152 and 153 thereon is secured a sleeve 154. The sleeve passes through an aperture in ear 155 on the elbow of bent arm 156. Between ear 155 and nut 153 there is a compression spring 157 disposed around sleeve 154. Arm 156 is pivotally connected at one end by a pin 158 to one end of a link 159, the other end of link 159 being connected to one end of shaft 25 journalled in bearing block 24. The other end of shaft 25 is connected through a pivoted link 160 (see Figure 2) similar to link 159 to another bent arm 161 similar to bent arm 156. The end of the horizontal part of bent arm 161 and a corresponding part of bent arm 156 are secured to the bar 19 by means of screws 162 and 163 (see Figure 1). By the means described the cam 47 and return motion spring 127 cause oscillation of bell crank 130 which, through the resilient and adjustable connection provided by spring 157, drives the feed hand formed by the lower side of bar 19 forward and backward.

Referring once more to Figure 6, rod 18 is clamped at 171 to the top of guide plate 54. The rod 18 slides in holes 172 and 173 in the base board 11 and guide block 15. The top end of rod 18 is rounded and is disposed beneath a horn 174 on the end of the top portion of bent arm 156. By this means when the bar 19 reaches the end of its forward travel the rod 18 lifts the horn and thus the bar and maintains the hand in raised position until the end of its backward travel, at which time the rod is lowered, permitting the bar by its own weight to lower until the serrated lower surface thereof rests on the strip of pimiento therebelow. To eliminate any possibility of a thick pimiento strip climbing up over the bar on its backward stroke, it is provided with a guard fin 175, secured to the back of the feed hand by screws 176 and 177.

Figure 4:
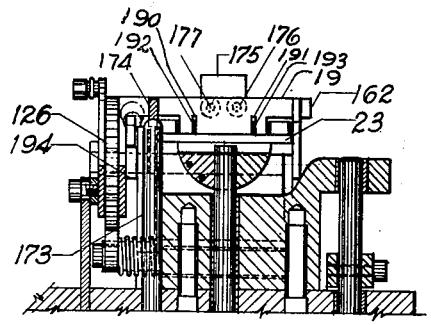
Figure 4 is a section on the line 4—4 of Figure 2.

Referring to Figure 4, the bar 19 is slotted at 190 and 191 to accommodate the ends 192 and 193 of the pimiento guide plates 30 and 31 which, as shown in Figure 1, extend a considerable distance beyond the terminations of the upper and lower flanges 32, 33, 34, and 35. Also shown in Figures 1 and 4 but best shown in Figure 7, there is a spacing washer 194 on belt pulley shaft 21 to space the ratchet wheel 126 and bell crank lever 130 from the bar 19 and the bent arms 159 and 161 connected to the bar by screws 163 and 162.

The foregoing constitutes not only means for driving the feed hand to move it periodically down onto the pimiento or other stuffing material and assist the conveyor in forcing it out over the end of the table until the leading edge of the hand is even with that of the table and thereafter raising the hand and returning it to its initial position, but together with the feed hand itself constitutes means for periodically raising and lowering the shear integrally connected thereto and forming the leading edge thereof. The back and forth horizontal travel of the shear is unnecessary to its cutting action and occurs merely because for simplicity it is made integral with the feed hand. This integral construction automatically synchronizes the two means.

In operation of the machine the cam shaft 43 will be continuously driven counterclockwise as viewed in Figures 1, 3 and 3A. Since all the cams are driven from the same shaft, the various means above referred to for driving the feed hand, shearing edge, jaw cutters, jaw fingers, and pimiento ejector, will operate in synchronism. From the position shown in Figure 3A in which radius A of shaft 43 is vertical upwards, rotation of the cam shaft until radius B is vertical will cause the cam follower 48 on cam 44 to rise to operate the jaws. This will cut off a slice of pimiento and fold it double. Then almost in unison the followers 49 and 50 will rise as radius C moves into vertical upwards position. This will cause the pimiento to be pushed up out of the jaw fingers into the olive above, the jaw fingers remaining closed during this period. Also, the pimiento feed hand and shear bar will be lifted up above the strip of pimiento on the belt conveyor.

As the cam shaft turns further until radius D is vertical upwards the follower 51 will rise rapidly permitting spring 127 to return the pawl 132 to ratchet driving position and draw the pimiento feed hand back over the pimiento strip on the belt conveyor. Shortly after the pawl starts its return motion the follower 49 moves down to withdraw the pimiento ejector plunger rod 17 from the jaw fingers. Then the follower 48 moves down to open the jaws while the follower 50 moves down to lower the pimiento feed hand and shear bar. Just as the pawl 132 reaches the limit of its return travel the pimiento feed hand portion of the bar comes to rest on the pimiento strip with the shearing edge of the bar at a point removed from the jaw cutters a distance equal to the width of the next pimiento slice. Also, the jaw fingers are sufficiently nearly fully open at this point to lie below the plane of the top of the conveyor belt.

Rotation of the cam shaft beyond the position in which radius D is vertical upwards to the initial position in which radius A is vertical upwards causes follower 51 to be moved down, which in turn drives the ratchet wheel clockwise (Figure 3), thus moving the top of the belt conveyor to the right, the pimiento feed hand above also moving to the right and the pimiento strip between the conveyor and feed hand moving to the right over the edge of the table 23 preparatory to the next cutting and folding operation.

From the foregoing description it is believed that the manner of achieving the stated objects of the invention and the advantages thereof will be clear. While a preferred embodiment of the invention has been illustrated and described it is obvious that many modifications thereof can be made without departing from the spirit of the invention. It is intended to cover by Letters Patent all forms of the invention falling within the scope of the appended claims.

I claim:

1. In apparatus for stuffing fruit, a support for a strip of material to be stuffed into the fruit, a shear disposed above the support having a shearing edge, means to mount the shear for movement between an elevated position and a lowered position with its shearing edge opposite the edge of the support, a pair of pivotally mounted jaws disposed adjacent said support having cutting edges on their sides nearest the support with the pivotal axis below and perpendicular to the edge of the support, means pivotally to mount said jaws for pivotal movement between an open position in which the jaws are in a horizontal line end to end just beneath the level of the table and a closed position in which the arms are substantially parallel and immediately adjacent each other, the pivot axis of said mounting being near the ends of the jaws that are adjacent when in open position, said motion of the jaws causing their cutting edges to traverse the shearing edge of the shear from positions away from the center thereof on opposite side towards the center thereof.

2. In apparatus for stuffing fruit, a table, a pair of concentrically pivoted jaws adjacent the table, the pivot axis of said jaws being parallel to and just below the plane of the table and perpendicular to the edge thereof and disposed midway between the sides of the table, a shear disposed slightly above said table and having a shearing edge parallel to the edge of the table leaving room thereunder for a strip of material to be sliced and stuffed into the fruit, means to move said jaws pivotally from an open position to the closed position and to cause said jaws during such motion to cooperate with said shear to cut a slice from said material and fold it double.

3. In apparatus for stuffing fruit, a combined cutting and folding device comprising a pair of members each having one semi-cylindrical face, one edge of each of said faces being sharpened, one of said members being mounted on the end of a shaft and the other of said members being mounted on a collar concentrically mounted on the shaft, the members being so mounted that the axes of their semi-cylindrical faces are radially disposed with respect to the axis of the shaft and collar, a shear mounted adjacent said members with its shear edge parallel and adjacent to the shear edge formed by the sharpened edges of said members when in alignment but spaced slightly therefrom and out of the path of motion of said members when they are rotated into closed position with their sharpened edges parallel and adjacent each other.

4. In apparatus for stuffing fruit, a support for a strip of material to be stuffed into the fruit, a shear disposed above the support having a shearing edge, means to mount the shear for movement between an elevated position in which it does not contact a strip of stuffing material of predetermined maximum thickness when placed beneath the shear on the support and a lowered position in which it engages and holds such a strip of material with its shearing edge opposite the edge of the support, a pair of jaws disposed adjacent said support, each of said jaws having a cutting edge and a finger adjacent thereto on the side opposite from the support, a mounting means for the jaws in which the jaws move with their cutting edges traversing the shearing edge of the shear from positions away from the center thereof on opposite sides towards the center thereof to cut off a slice of said material placed on the support and held by said shear and projecting beyond the shear and support and to cause said fingers to move from an open position in which the fingers are in a horizontal line end to end just beneath the level of the table to support the slice to a closed position in which the fingers are substantially parallel and immediately adjacent each other, the motion of said fingers from open to closed position folding double said slice of said material.

5. In apparatus for stuffing fruit, a support for a strip of material to be stuffed into the fruit, a shear disposed above the support having a shearing edge, means to mount the shear for movement between an elevated position in which it does not contact a strip of stuffing material of predetermined maximum thickness when placed beneath the shear on the support and a lowered position in which it engages and holds such a strip of material with its shearing edge opposite the edge of the support, a pair of jaws disposed adjacent said support, each of said jaws having a cutting edge and a trough shaped finger adjacent thereto on the side opposite the support, a mounting means for the jaws in which the jaws move with their cutting edges traversing the shearing edge of the shear from positions away from the center thereof on opposite sides towards the center thereof to cut off a slice of said material placed on the support and held by said shear and projecting beyond the shear and support and to cause said fingers to move from an open position in which the fingers are in a horizontal line end to end just beneath the level of the table and upwardly concave to support the slice to a closed position in which the fingers are substantially parallel and immediately adjacent each other to form a tube-like structure, the motion of said fingers from open to closed position folding double said slice of said material, and means for ejecting said folded slice from said tube-like structure.

6. In apparatus for stuffing fruit, a combined cutting and folding device comprising a pair of members each having one semi-cylindrical face, one edge of each of said faces being sharpened, one of said members being mounted on the end of a shaft and the other of said members being mounted on a collar concentrically mounted on the shaft, the members being so mounted that the axes of their semi-cylindrical faces are radially disposed with respect to the axis of the shaft and collar, a shear mounted adjacent said members with its shear edge parallel and adjacent to the shear edge formed by the sharpened edges of said members when in alignment but spaced slightly therefrom and out of the path of motion of said members, means to rotate the members into closed position with their sharpened edges parallel and adjacent each other, and a rod reciprocably mounted adjacent said members adapted to more therebetween when they are closed.

7. In combination, a shaft, a cylindrical hub on the end of the shaft, a first jaw comprising a ninety degree sector of a disc mounted on the end of said hub, the radial surfaces of said sector being semi-cylindrical, a cylindrical collar rotatably mounted on said hub, a second jaw of like construction to the first jaw mounted on the face of the collar, a table comprising a flat plate adjacent said jaws, a shear comprising a bar having a square corner disposed above the table adjacent the jaws, an arm carrying said bar at one end of the arm, the other end of the arm being pivotally mounted, an apertured support above the jaws, a rod, a bearing for the rod in which it can reciprocate, the axis of the rod and bearing being in line with the cylindrical hole formed between the jaws when two of their radial surfaces are adjacent and vertical and in line with the aperture in the support, a cam shaft, a plurality of cams on said shaft, and linkages connecting said cams with said bar to periodically raise and lower the shear and with said jaws to periodically oscillate them from a position in which one pair of radial surfaces are in contact to a position in which the other pair are in contact and with said rod to reciprocate same.

8. In apparatus for stuffing fruit, a pepper strip feed comprising a base, a table secured to said base, said table being of short length in the direction of feed compared to the length of a pepper strip, an endless conveyor adjacent the table, a feed hand above the conveyor, a link pivotally connected at one end to the feed hand for supporting same, said link being pivotally connected at its other end to said base, means for reciprocating the feed hand back and forth above the table along the line of motion of said conveyor, said means being resiliently connected to said feed hand, and means to lift said feed hand against gravity to hold it in an elevated position during its motion in the direction opposite to the direction of the conveyor.

9. In apparatus for stuffing fruit, a support for a strip of material to be stuffed into the fruit, said support being of short length compared to the length of the strip, a non-reversing conveyor adjacent the support for supporting the remainder of the strip and moving it toward the support, a shear disposed above the support having a shearing edge, means to mount the shear for movement between an elevated position in which it does not contact a strip of stuffed material of predetermined maximum thickness when placed beneath the shear on the support and a lowered position in which it engages and holds such a strip of material with its shearing edge opposite the edge of the support, a pair of jaws disposed adjacent said support, each of said jaws having a cutting edge and a finger adjacent thereto on the side opposite from the support, a mounting means for the jaws in which the jaws move with their cutting edges traversing the shearing edge of the shear from positions away from the center thereof on opposite sides towards the center thereof to cut off a slice of said material placed on the support and held by said shear and projecting beyond the shear and support and to cause said fingers to move from between an open position in which fingers are in a horizontal line end to end just beneath the level of the table to support the slice to a closed position in which the fingers are substantially parallel and immediately adjacent each other, the motion of said fingers from open to closed position folding double said slice of said material.

10. In apparatus for stuffing fruit, a support for a strip of material to be stuffed into the fruit, said support being of short length compared to the length of the strip, a non-reversing conveyor adjacent the support for supporting the remainder of the strip and moving it toward the support, a shear disposed above the support having a shearing edge, means to mount the shear for movement between an elevated position in which it does not contact a strip of stuffing material of predetermined maximum thickness when placed beneath the shear on the support and a lowered position in which it engages and holds such a strip of material with its shearing edge opposite the edge of the support, a pair of jaws disposed adjacent said support, each of said jaws having a cutting edge and a trough shaped finger adjacent thereto on the side opposite to the support, a mounting means for the jaws in which the jaws move with their cutting edges traversing the shearing edge of the shear from positions away from the center thereof on opposite sides towards the center thereof to cut off a slice of said material placed on the support and held by said shear and projecting beyond the shear and support and to cause said fingers to move from an open position in which the fingers are in a horizontal line end to end just beneath the level of the table and upwardly concave to support the slice to a closed position in which the fingers are substantially parallel and immediately adjacent each other to form a tube-like structure, the motion of said fingers from open to closed position folding double said slice of said material, and means for ejecting said folded slice from said tube-like structure.

11. In apparatus for stuffing fruit, a table for supporting a strip of material to be stuffed into the fruit, said table being of short length compared to the length of the strip, a non-reversing conveyor means adjacent the table for supporting the remainder of the strip and moving it toward the table, step-by-step drive means for said conveyor to move it toward the table to advance the material onto and beyond the edge of the table, a bar having a portion on its underside adapted to engage the material, drive means for said bar synchronized and in phase with the first said drive means to move the bar down onto the material and thence toward and over the table until the forward side of the bar is even with the forward side of the table, the corner formed by the forward and undersides of said bar constituting a shearing edge, a pair of jaws adjacent the table on the opposite side from the conveyor, each of said jaws having a cutting edge and a finger adjacent thereto on the side opposite from said table, drive means for the jaws synchronized with the aforesaid drive means to cause their cutting edges to traverse said shearing edge from positions away from the center thereof on opposite sides towards the center thereof to cut off a slice of material after it has been projected over the edge of the table by said conveyor and bar and to cause said fingers to move from an open position in which the fingers are in a horizontal line end to end just beneath the level of the table to support the slice to a closed position in which the fingers are substantially parallel and immediately adjacent each other, the motion of said fingers from open to closed position folding a slice of material cut off by said cutters and shearing edge.

12. In apparatus for stuffing fruit, a table, a conveyor adjacent to said table at one side thereof, a pair of concentrically pivoted jaws adjacent the table at the opposite side thereof from said conveyor, the pivot axis of said jaws being parallel and just below the plane of the table perpendicular to the edge thereof opposite said conveyor and disposed midway between the sides of the table, said jaws being trough shaped so as to form a tubular passage there-between when closed, a shear disposed slightly above said table leaving room thereunder for a strip of material to be sliced and stuffed into the fruit, means for moving said jaws from a wide-open position in which they are substantially in a straight line to the closed position cooperating with said shear to cut a slice from said material and fold it double, an apertured rest for fruit disposed just above the top end of said tubular passage, a reciprocably mounted rod disposed beneath said table, and means for moving said rod upwardly into said tubular passage to eject said slice and push it into said fruit through said aperture in the rest.

13. Apparatus for stuffing fruit comprising a support for the fruit, a table beneath the support and slightly to one side thereof, an endless conveyor means adjacent to the table further to the side of the support adapted to support a strip of stuffing material, step by step drive means for said conveyor to move it toward the table to advance the material onto and beyond the edge of the table, a bar having a portion on its underside adapted to engage the material, drive means for said bar synchronized and in phase with the first said drive means to move the bar down onto the material and thence toward and over the table until the forward side of the bar is even with the forward side of the table, the corner formed by the forward and undersides of said bar constituting a shearing edge, a pair of jaws beneath the support adjacent to the table on the opposite side from the conveyor, each of said jaws having a cutting edge and a trough shaped finger adjacent thereto on the side opposite from the table, drive means for the jaws synchronized with the aforesaid drive means to cause their cutting edges to traverse said shearing edge from positions away from the center thereof on opposite sides towards the center thereof to cut off a slice of material after it has been projected over the edge of the table by said conveyor and bar and to cause said fingers to move from an open position in which the fingers are in a horizontal line end to end just beneath the level of the table and upwardly concave to support the slice to a closed position in which the fingers are substantially parallel and immediately adjacent each other to form a tube-like structure aligned with and just beneath the fruit support, the motion of said fingers from open to closed position folding a slice of material cut off by said cutting edges of the jaws and shearing edge of the bar, an ejector adapted to fit within said tube-like structure, and drive means for the ejector synchronized with the aforementioned drive means to cause the ejector to reciprocate along the axis of said tube-like structure between a retracted position below said tube-like structure and an extended position near the upper end of said tube-like structure and just below said support, the motion of said ejector from retracted to extended position after said fingers have come into closed position ejecting said slice therefrom into said fruit.

14. In combination, a support having a hole in the bottom thereof, a flat topped table beneath and at one side of said support, an endless conveyor adjacent the table, means to move the conveyor in step by step manner, a bar having a serrated under surface forming a feed hand and a smooth side surface joining the under surface at a sharp corner forming a shear, said bar being mounted over the conveyor and table, means mounting the bar for motion in a path running horizontally over the conveyor to the edge of the table and then back again at slightly higher level, a pair of jaws beneath the support adjacent to the table on the opposite side from the conveyor, each of the jaws having a cutting edge and a trough shaped finger adjacent thereto on the side opposite the table, means mounting the jaws for motion between an open position in which the cutting edges and fingers thereof are in a horizontal line end to end adjacent the edge of the table and just beneath the level of the table with the trough of the fingers upwardly concave and a closed position in which the cutting edge and fingers are substantially parallel and immediately adjacent each other to form a tube-like structure aligned with and just below the hole in the support, a rod, means mounting the rod for reciprocation along the axis of said tube-like structure, and synchronized drive means for the first said means, said bar, jaws, and rod.

WILLIAM HUNGATE.

REFERENCES CITED

The following references are of record in the file of this patent:

UNITED STATES PATENTS

| Number | Name | Date |
|---|---|---|
| 202,751 | Pierpont | Apr. 23, 1878 |
| 485,981 | Potter | Nov. 8, 1892 |
| 494,946 | Watson | Apr. 4, 1893 |
| 667,423 | Brown | Feb. 5, 1901 |
| 716,331 | Brown | Dec. 16, 1902 |
| 749,697 | Middlekauff | Jan. 12, 1904 |
| 1,396,290 | Segschneider | Nov. 8, 1921 |
| 1,502,929 | Tuttle | July 29, 1924 |
| 2,077,336 | Lemming | Apr. 13, 1937 |
| 2,085,110 | Luther | June 29, 1937 |
| 2,157,457 | Langrish | May 9, 1939 |
| 2,242,242 | Ewald | May 20, 1941 |